(12) United States Patent
Onu

(10) Patent No.: US 6,404,808 B1
(45) Date of Patent: Jun. 11, 2002

(54) PERIOD DETERMINATION OF SAMPLED PSEUDO-RANDOM BINARY SEQUENCE GENERATED SIGNALS

(75) Inventor: Dan Onu, Lake Oswego, OR (US)

(73) Assignee: Tektronix, Inc., Beaverton, OR (US)

( * ) Notice: Subject to any disclaimer, the term of this patent is extended or adjusted under 35 U.S.C. 154(b) by 0 days.

(21) Appl. No.: 09/258,018

(22) Filed: Feb. 25, 1999

Related U.S. Application Data

(60) Provisional application No. 60/079,161, filed on Mar. 24, 1998.

(51) Int. Cl.⁷ .............................. H04B 3/46; H04B 1/69
(52) U.S. Cl. ........................................ 375/224; 375/130
(58) Field of Search .................................. 375/224, 130, 375/146, 147, 213, 145, 354

(56) References Cited

U.S. PATENT DOCUMENTS

| | | |
|---|---|---|
| 3,883,729 A | 5/1975 | de Cremiers |
| 4,745,621 A | 5/1988 | Sawaya et al. |
| 5,046,179 A | 9/1991 | Uomori et al. |
| 5,103,417 A | 4/1992 | Halliday |
| 5,267,271 A | 11/1993 | Rice |
| 5,349,550 A | 9/1994 | Gage |
| 5,457,645 A | 10/1995 | Suzuki |
| 5,485,395 A | 1/1996 | Smith |
| 5,584,295 A | 12/1996 | Muller et al. |
| 5,790,591 A | * 8/1998 | Gold et al. .................. 375/142 |
| 5,917,852 A | * 6/1999 | Butterfield et al. ......... 375/141 |

* cited by examiner

Primary Examiner—Chi Pham
Assistant Examiner—Khai Tran
(74) Attorney, Agent, or Firm—Thomas F. Lenihan

(57) ABSTRACT

An apparatus and method for determining the period of a data signal encoded using PN sequences may be implemented using software, and takes advantage of the fact that the signal is generated based upon a pseudo-random binary sequence, and of the fact that the order of the characteristic polynomial is known. The apparatus and method uses knowledge about the structure of the signal generator (i.e. the order of the characterizing polynomial of the encoding PN sequence), and recognizes the fact that short data tokens from the original signal can be used with the same success in determining the period as longer sequences having at least the length of the period.

5 Claims, 2 Drawing Sheets

PERIOD DETERMINATION OF SAMPLED PSEUDO-RANDOM BINARY SEQUENCE GENERATED SIGNALS

The Application claims a benefit of Provisional Application No. 60/079,161 filed Mar. 24, 1999.

FIELD OF THE INVENTION

The present invention relates to determining the period of signals encoded by a pseudo-random binary sequence, and sampled analog signals obtained after line coding a pseudo-random binary sequence.

Pseudo-random binary sequences are frequently used in digital communications systems, for example in magnetic recording systems. Usually, such sequences are generated using linear feedback registers to ensure periodicity. The structure of the binary data generator is given by the characteristic polynomial describing the pseudo-random binary sequence. The orders of the characteristic polynomials typically span a range of from 3 to 30 and even higher.

In a digital communication system, a stream of data bits, generated by the linear feedback register, represents a data signal having a period $T_{PER}$. The resulting signal is periodic, with the number of bits in one period determined by the characteristic polynomial of the pseudo-random binary sequence. Usually, sequences are used which have the property that one pattern has the maximum possible length (number of bits) for the order of the characteristic polynomial, termed pseudo-noise (PN) sequences. For example, for a PN sequence with a characteristic polynomial of order N the number of bits in the resulting bit pattern is $L=2^N-1$. In the following description, the repeat cycle time of the bit pattern is intended to be the period of the pseudo-random binary sequence.

Determining the period of PN sequence generated signals is necessary for many applications in digital communications. The procedure usually requires the comparison of the signal being analyzed with a delayed version of itself. For speed, a time-windowed part of the signal is used. In prior art methods, the window was required to contain at least one full period of L bits of the signal for the known algorithms to successfully determine the period of the PN sequence.

SUMMARY OF THE INVENTION

The present invention proposes a methodology for detecting the signal period which takes maximum advantage of the fact that the signal is generated based on a pseudo-random binary sequence, and of the fact that the order of the characteristic polynomial is known.

L is the number of bits per pattern generated by a characteristic polynomial of order N; in particular, for a PN sequence $L=2^N-1$ (as described above). The inventor realized that the order N of the characteristic polynomial is the minimum number of successive bits in the pattern which are non-repeating in any sub-sequence of L consecutive bits containing all the N previously mentioned bits. Thus, known algorithms may be used successfully to detect the data signal period, using a time-windowed part of the signal containing as few as N bits. This N bit long subsequence functions as a waveform 'token', which is included in the signal, and repeats with exactly the same period as the signal itself.

In known systems, using known period detection algorithms, the length of the token is usually taken to be $L=2^N-1$ bits. Because the time required by a given algorithm to determine the period increases linearly with the bit width of the token used (i.e. scales linearly), a system according to the present invention would give a speed improvement of $$\Delta S = \frac{2^N-1}{N} \quad (1)$$

L/N over the prior art systems. Specifically, in the case of PN sequences, widely used as pseudo-random sequences, the speed improvement $\Delta S$ is given in equation (1). For N=7 (i.e. L=127) the speed improvement is 18; for N=9 it is 56, and increases almost 2 times for each integral increase in the order N of the characteristic polynomial.

A system for determining the period of a data signal encoded using PN sequences may be implemented using software, analyzing encoded bit stream signals which have been sampled and stored in a memory. When implemented in this form, a system according to the present invention is highly portable. For example, it may be implemented in software code developed using a high-level programming language (e.g. JAVA). It differs from known art (described above) because it is uses knowledge about the structure of the signal generator (i.e. the order of the characterizing polynomial of the encoding PN sequence), and recognizes the fact that short data tokens from the original signal can be used with the same success in determining the period as longer sequences having at least the length of the period. Such code does not require any specific period detecting algorithm for the its core period detection mechanism. Instead, it works as a pre-filter reducing the amount of data which must be processed by the detection algorithm. Another advantage of systems according to the present invention is that they may be implemented on systems that lack a powerful general purpose processor, for example, digitizing oscilloscopes. The increase of processing speed made possible by the present invention would make feasible a number of data processing applications for the digital communications market in such systems.

DETAILED DESCRIPTION

Figure 1:
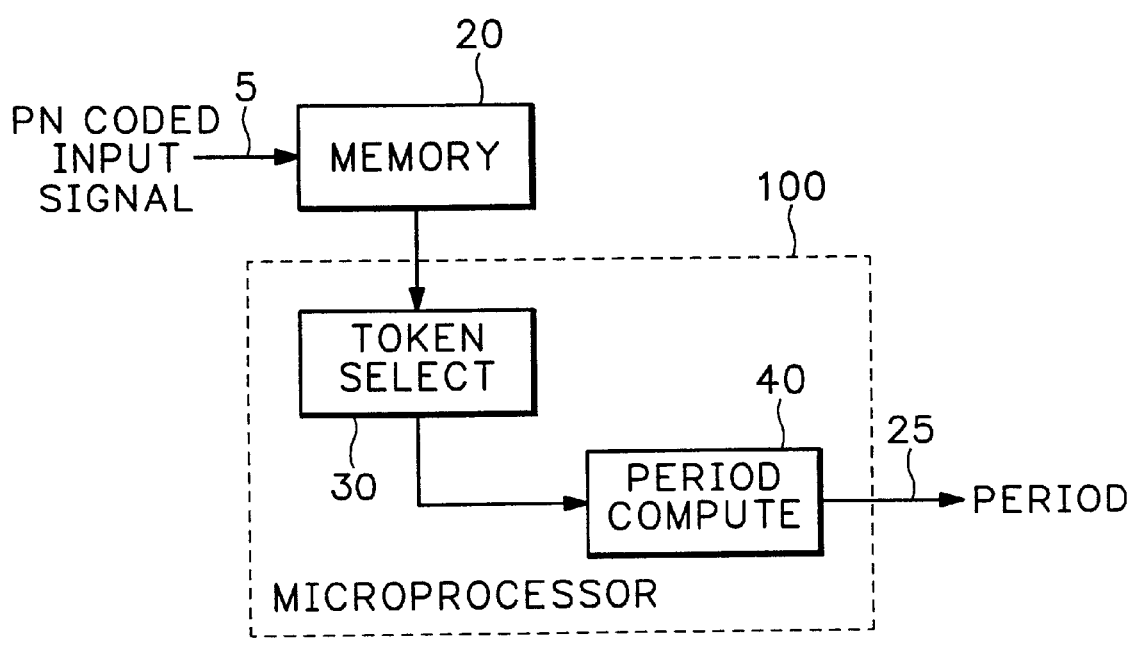
FIG. 1 is a block diagram of a system according to the present invention.

FIG. 1 is a block diagram of a system according to the present invention. In FIG. 1, an input terminal 5 is coupled to a source (not shown) of an input binary signal encoded using known techniques with a PN sequence. Input terminal 5 is coupled to an input terminal of a memory 20. An output terminal of the memory 20 is coupled to an input terminal of a token selector 30. An output terminal of a token selector 30 is coupled to an input terminal of a period computing circuit 40. An output terminal of the period computing circuit 40, generates a signal representing the period of the input signal at input terminal 5, and is coupled to an output terminal 25. Output terminal 25 is coupled to utilization circuitry (not shown) which may include a display device for displaying the period of the input signal either on a display screen, such as an oscilloscope, or a separate display device. The utilization circuitry may also include circuitry for using the period representative signal as input for further computations related to the input signal, all in a known manner.

The token selector 30 and the period computing circuit 40 may be implemented in a microprocessor 100, as illustrated in phantom in FIG. 1. In such an implementation, the memory 20 may be coupled to the microprocessor 100 via either the memory bus of the microprocessor 100, or via input/output (I/O) interface circuitry coupled to the microprocessor 100; and the utilization circuitry (not shown) may be coupled to the microprocessor 100 via I/O interface circuitry.

In operation, the PN encoded input signal at input terminal 5 is encoded using a PN sequence defined by a characteristic polynomial of order N. The token selector 30 is coupled between the memory 20, which stores a predetermined number of bits of the PN encoded input signal from input terminal 5, and the period computing circuit 40. The token selector 30 selects a token having N samples from among the samples of the input signal stored in the memory 20. The period computing circuit 40 processes one or more tokens from the token selector 30, possibly taken at different locations within the samples stored in the memory 20, to compute the period of the signal encoded by the PN sequence. No fewer than N samples may be selected by the token selector 30 as one token, although more than N samples may be selected. Depending upon the algorithm used by the period computing circuit 40, a larger number of bits in the token may lead to improved accuracy in determining the period of the input signal. Any number equal to or greater than N but less than the number $L=2^N-1$ will lead to improved performance of such an algorithm over prior methods.

Figure 2A:
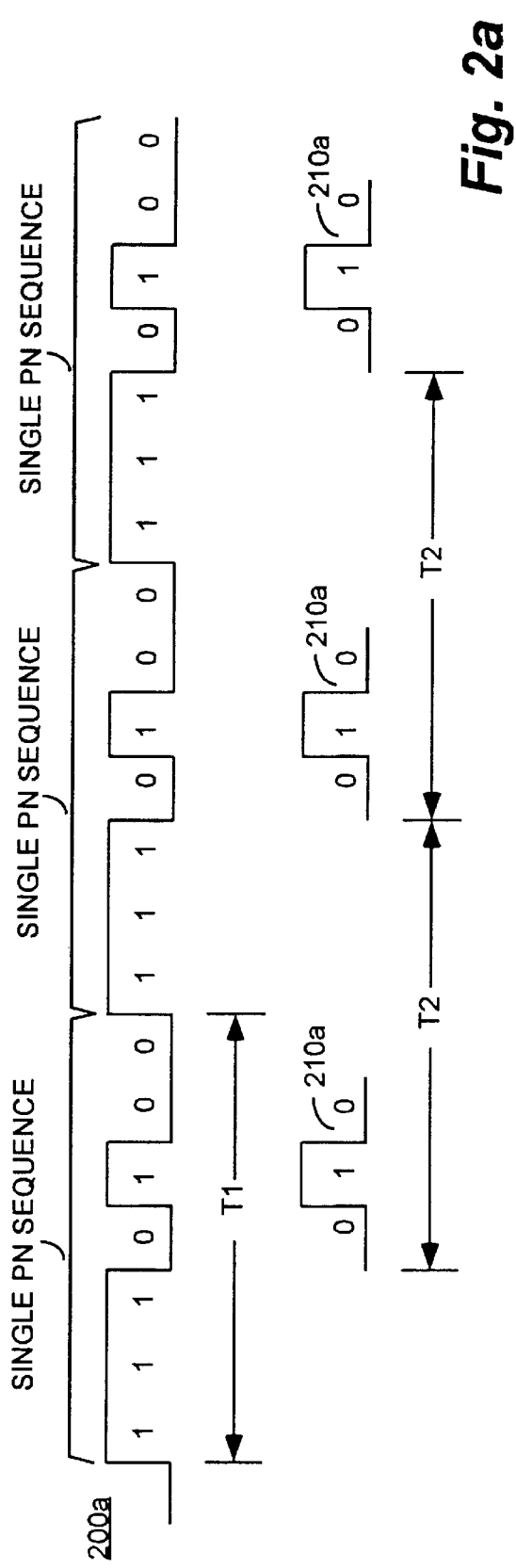
FIG. 2a is an illustration of a 7-bit PN sequence and N-bit token (N=3) useful in understanding the invention.

Referring to FIG. 2a, a signal, generally designated 200a, comprises a repeating series of single PN sequences having a period of T1. The simple 7-bit PN sequence (1110100) shown was generated by hardware comprising a shift register and associated feedback circuitry in a well-known manner in accordance with the characteristic polynomial $X^3+X+1$. As was noted above, prior art systems required comparison of the entire PN sequence in order to establish the period of the signal. It is herein recognized that a lesser number of bits made be compared to determine the periodicity of the signal, as noted above. In the example of FIG. 2a, L (in the equation $L=2^N-1$) is equal to seven (the number of bits in the PN sequence), and it follows therefore that N is equal to three. Thus, it is herein recognized that a sample of three consecutive bits is the fewest number of bits which may be compared to accurately determine the periodicity of the PN sequence. That is, if a sample of three consecutive bits is taken from the PN sequence, the period T2 of the 3-bit sample 210a is exactly equal to the period T1 of the entire PN sequence. This results in a much less complex comparison, involving much simpler hardware, and a speedier identification of the period of the PN sequence.

Figure 2B:
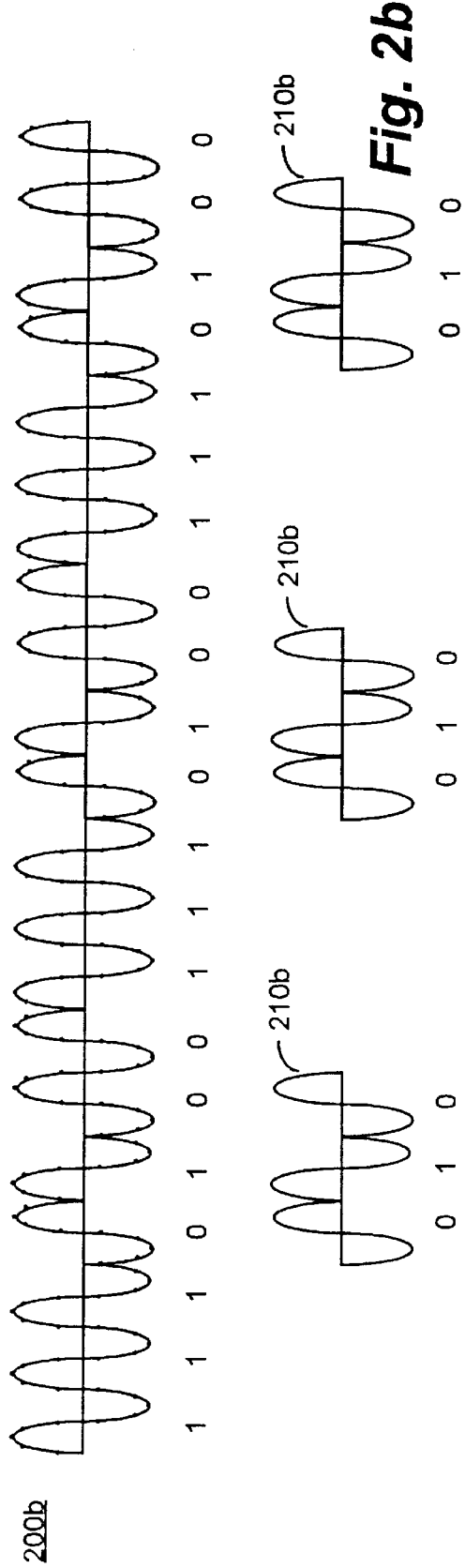
FIG. 2b is an illustration of the sequence of FIG. 2a modulated using a sine wave shaped pulse for line coding. The effective format of the coded signal is BPSK.

It is herein recognized that an analog signal obtained from a PN sequence by line coding may be sampled to determine its periodicity. FIG. 2b shows the PN sequence 200a of FIG. 2a line coded in Binary Phase Shift Keying (BPSK) format. As is well known, in BPSK format a binary 1 may be represented as a single cycle of 0 degree phase, and a binary 0 may be represented as a single cycle of 180 degree phase. The bit values are shown below each sine wave cycle in FIG. 2b. While BPSK modulation is chosen to describe an embodiment of the invention, it should be noted that other modulations schemes could be utilized without departing from the teaching of the subject invention. In such other modulation schemes the one-bit may be represented by a particular function p(t) and the zero bit represented by a second function h(t). Depending upon the complexity of p(t), and h(t) it may be advantageous to oversample the analog signal in each bit period. In this regard, oversampling points are illustrated as dots superimposed on sine wave 200b of FIG. 2b. It should be noted that the discussion of the relationship of T1 to T2 given above with respect to FIG. 2a applies equally well to FIG. 2b. In this regard, the samples labelled 210b correspond to the samples labelled 210a, and serve the same purpose.

The proposed algorithm was implemented and tested on a Tektronix, Inc. TDS754 premium digitizing oscilloscope, using JAVA as a programming language. The periodic signal to be analyzed was generated with a Sony Corp./Tektronix, Inc. AWG520 signal generator, which has capabilities for PN sequence generation and encoding. The PN sequence was coded using On-Off signaling (h(t)=0), with p(t) being a lorentzian pulse. In this application p(t) was sampled eight times per bit period. The period determining application running on the oscilloscope performed with very high accuracy in detecting the incoming signal period. The application was further tested using a Sun-Sparc workstation as a controller, and it performed with similar results. The period information may be utilized to determine phase or frequency characteristics of the input signal.

The term "microprocessor" as used herein is intended to include computers, microcomputers, and other controllers such as dedicated hardware and ASICs. As noted above, while the BPSK modulation format was chosen to describe an embodiment of the invention, other modulation schemes are also applicable and are intended to lie within the scope of the following claims.

What is claimed is:

1. A method for determining the period of a repeating pattern of sampled pseudo-random binary sequence generated signals, comprising the steps of:

selecting a waveform token having a characteristic such that $L=2^N-1$, where L represents the number of bits of said sampled pseudo-random binary sequence, said waveform token being at least N bits long but less than L bits long, and said waveform being non-repeating in a subsequence of L consecutive bits of said of each of said sampled pseudo-random binary sequence generated signals;

comparing said waveform token to said sampled pseudo-random binary sequence generated signals to detect occurrence therein; and measuring a repetition rate of said waveform token to determine frequency or phase characteristics of said sampled pseudo-random binary sequence generated signals.

2. The method of claim 1, wherein:

any subset of said sampled pseudo-random binary sequence comprising at least N but less than L consecutive bits is suitable for selection as said waveform token.

3. Apparatus for determining the period of a repeating pattern of sampled pseudo-random binary sequence generated signals, comprising:

memory circuitry for storing and a predetermined number of bits of said of sampled pseudo-random binary sequence generated signals;

a controller selecting a waveform token having a characteristic polynomial of the form $L=2^N-1$, where L is the number of bits per pattern of said sampled pseudo-random binary sequence, said waveform token being at least N-bits long, but less than L bits long, and being non-repeating in a subsequence of L consecutive bits of said sampled pseudo-random binary sequence;

said controller comparing said waveform token to said sampled pseudo-random binary sequence generated signals to detect occurrence therein; and said controller measuring a repetition rate of said waveform token to determine frequency or phase characteristics of said sampled pseudo-random binary sequence generated signals.

4. The apparatus of claim 3, wherein:

any subset of said sampled pseudo-random binary sequence comprising at least N but less than L consecutive bits is suitable for selection as said waveform token by said controller.

5. The apparatus of claim 4, wherein:

an analog signal is obtained by line coding said pseudo random binary sequence, and said waveform token is obtained by sampling said analog signal.

* * * * *